United States Patent [19]

Good et al.

[11] 4,429,158
[45] Jan. 31, 1984

[54] POLYAMINE COMPOUNDS AND THEIR USE AS CURING AGENTS FOR EPOXY RESINS

[75] Inventors: Raymond H. Good, Barrington, Ill.; Paul McBride, Aughton, England

[73] Assignee: Eastman Kodak Company, Rochester, N.Y.

[21] Appl. No.: 301,919

[22] Filed: Sep. 14, 1981

[30] Foreign Application Priority Data

Jun. 16, 1981 [GB] United Kingdom ................ 8118448

[51] Int. Cl.$^3$ ...................... C07C 87/36; C07C 87/38
[52] U.S. Cl. .................................. 564/455; 564/336; 564/372; 564/453; 528/111
[58] Field of Search ................ 564/453, 455, 336, 372

[56] References Cited

U.S. PATENT DOCUMENTS

| | | | |
|---|---|---|---|
| 3,527,804 | 9/1970 | Cyba ..................... | 564/453 |
| 3,755,445 | 8/1973 | Hanschke et al. ................. | 564/453 |
| 3,855,297 | 12/1974 | Diana et al. ..................... | 564/455 X |
| 3,867,454 | 2/1975 | Diana et al. ..................... | 564/453 X |
| 4,022,833 | 5/1977 | Diana et al. ......................... | 564/455 |
| 4,119,668 | 10/1978 | Diana et al. ..................... | 564/455 X |

*Primary Examiner*—Paul F. Shaver
*Attorney, Agent, or Firm*—Donald W. Spurrell; Daniel B. Reece, III

[57] ABSTRACT

Disclosed ar novel polyamine compounds having the general formula

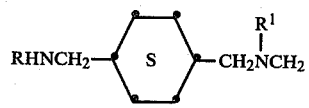

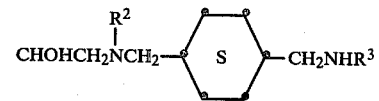

wherein R, $R^1$, $R^2$ and $R^3$ are each independently selected from hydrogen and alkyl groups which may be substituted, the preparation of such compounds and their use as curing agents for epoxy resins.

7 Claims, No Drawings

POLYAMINE COMPOUNDS AND THEIR USE AS CURING AGENTS FOR EPOXY RESINS

This invention relates to polyamine compounds and to their preparation and use. The compounds have the general formula

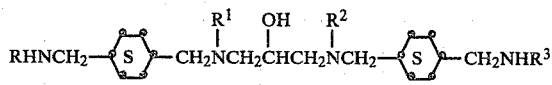

wherein R, $R^1$, $R^2$ and $R^3$ are each independently selected from hydrogen and straight or branched chain alkyl groups of 1 to 10, preferably 1 to 6, and most preferably 1 to 3 carbons which may be substituted with 1-3 of the same or different groups selected from alkoxy of 1-10 carbons, phenyl, cyclohexyl and hydroxyl. These compounds are particularly effective as curing agents for epoxy resins.

It is known that polyepoxides may be cured with a variety of amines such as pyridine, piperidine, diethylenetriamine, meta-phenylene diamine, bis(1-aminocycloalkylmethyl)amines, and ethylenediamine. The use of such amines has not been satisfactory in certain commercial applications for a number of reasons. For example, such amines can be quite volatile and generate noxious fumes during and after curing which causes irritation of the eyes and skin, they can be difficult to blend with epoxy resins and fail to give products having sufficient hardness and strength, especially at elevated temperatures, and frequently they can impart poor pot life to the resin as well as unsatisfactory colour to the cured product.

It has been found that the polyamines of the above general formula are excellent curing agents for a broad range of epoxy resins, imparting much improved properties thereto without the aforementioned drawbacks. These polyamines can be produced readily by reacting epichlorhydrin with a diamine or diamines of the formula

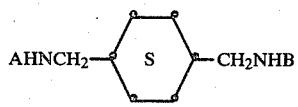

wherein A and B, which may be the same or different, are selected from R, $R^1$, $R^2$ and $R^3$ as defined above. The reaction is preferably carried out in a suitable solvent in the presence of an acid scavenger at concentrations preferably approaching theoretical, at temperatures between the freezing and boiling point of the reaction mixture, and in an open or closed reactor at pressures ranging from subatmospheric to superatmospheric.

The molar ratio of the diamine to epichlorhydrin can vary widely, but is preferably within the range from 2/1 to 5/1, and most preferably between 2 to 2.2/1. It is possible to carry out the reaction in the absence of either or both of HCl scavenger and solvent, but the reaction would take an excessive period of time to complete and would require rigorous agitation to ensure even dispersion of the reactive materials. It is preferred, therefore, that a suitable base such as sodium hydroxide be used and that the reactive materials be dispersed in a suitable solvent such as water and/or an alcohol of from 2 to 6 carbons such as methanol, ethanol, butanol or propanol. A mixture of methanol and water with a preponderant proportion of methanol is a preferred solvent. The base is added as necessary to reduce the HCl level, and can be of any type including alkali or alkaline earth hydroxides, and amines, as long as it is selected from those bases which do not enter into or adversely affect the principal reaction.

As aforesaid, the temperature of the reaction can vary widely. However, the preferred range is between 0° C. and the boiling point of the reaction system, with 10° C. to 40° C. being most preferred. It is preferred to carry out the reaction at atmospheric pressure. Although higher or lower pressures can be used if desired, no advantage in the use of the more extreme conditions is evident. The reaction usually takes several hours to complete at about room temperature and atmospheric pressure, after which the polyamine can be separated from the solvent and catalyst by known means such as evaporation and filtration. The polyamine products are clear liquids which have little odour and do not impart objectionable colour to cured resins.

These curing agents or hardeners find particular utility for curable epoxy adhesive compositions used for adhering together a variety of materials including metal, plastics, glass, and ceramics to form structural components or laminated articles, and are applicable to epoxy resins of widely varying molecular weights and viscosities. The metal-to-metal adhesive bonds achieved by these curing agents exhibit shear and bond strengths superior to those of many conventional epoxy adhesives. Typical useful epoxy resins are those prepared from epichlorohydrin and polyhydroxy compounds, particularly bisphenol-A. In addition to these glycidyl polyethers, the hardeners are useful with mixed polyethers containing olefinic unsaturation, e.g. the allyl glycidyl mixed diether of bisphenol-A. Also, other polyhydric alcohols, polyfunctional halohydrins and polyepoxides are useful and include such compounds as alpha and beta dichlorohydrin, butadiene dioxide, diglycidyl ether, resorcinol, hydroquinone, pyrocatechol, phloroglucinol, bisphenol-F, dihydroxy biphenyl, dihydroxy diphenyl sulphone, ethylene glycol, erythritol and glycerol. More complete listings of useful epoxy resins appear in U.S. Pat. Nos. 2,817,644 and 2,633,458. As stated in those specifications and as applicable to the present invention, the useful polyepoxides have an "epoxide equivalency" greater than one and preferably are those possessing per average molecule at least two epoxide

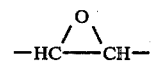

groups which preferably are terminal, i.e.

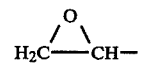

groups. The term "epoxide equivalency" refers to the number of

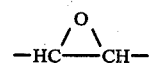

groups, determined by established analytical techniques, contained in the average molecular weight of the polyepoxide concerned. The polyepoxides may be saturated or unsaturated, aliphatic, cycloaliphatic, aromatic or heterocyclic and may be substituted if desired with substituents such as chlorine atoms, hydroxyl groups, and ether radicals, and may be monomeric or polymeric.

The amount of hardener to be used depends on the type of epoxy resin, the curing rate desired, the curing conditions, and other factors. For example, from 14 to 35% by weight of hardener per total weight of resin plus hardener would be useful in ordinary epoxy resin systems. As shown in Table 1 below, a useful range of hardener for the particular resin employed therein in parts by weight based on total parts by weight of resin plus hardener of 100, is indicated to be from 16 to 30, or more. The most effective amount of hardener for any particular resin system, and its application, including curing temperature considerations, are readily ascertainable by those skilled in the art.

The following examples illustrate a specific preparation of a polyamine of the present invention and its use as a curing agent. These examples are illustrative only, however, and are not to be construed as limiting the invention in any manner.

EXAMPLE I 1,3-Bis(4-Aminomethylcyclohexylmethylamino)propan-2-ol

A solution of 2.0 g. of sodium hydroxide in 5 ml of water was added to a stirred solution of 14.2 g. of 1,4-cyclohexanebis(methylamine) (CHBMA) in 100 ml of methanol. The mixture was cooled in ice and maintained at a temperature of 10° C. during a dropwise addition of 4.63 g. of epichlorhydrin over a period of 10 minutes. The reaction mixture was stirred for 12 hours while allowing the temperature to equilibrate to 20° C. over this period. A small quantity (about 1.4 g.) of sodium chloride was removed by filtration. The reaction mixture was further heated to reflux and stirred for 2 hours and about 1.2 g. of sodium chloride was separated by filtration. The methanol was then completely evaporated from the reaction mixture using a rotary evaporator to leave a colourless oil product weighing 17.0 g. Infra-red and N.M.R. analysis confirmed the structure of the product as 1,3-bis(4-aminomethylcyclohexylmethylamino)propan-2-ol, hereinafter referred to as BACMP.

EXAMPLE II

Evaluation of Curing Agents in Adhesive Applications

For all the comparative evaluations an epoxy resin AY 150 sold by Ciba-Geigy and based on the diglycidyl ether of bisphenol-A was used. In these evaluations, the curing effectiveness, measured as average load at bond failure (Table 2), of triethylene tetramine (TETA), CHBMA, and the present BACMP in the above resin were compared. The formulations tested are given in Table 1 below, wherein each of the formulation groups A-D-H, B-E-I and C-F-J contained substantially equimolar amounts of the compared hardeners. Formulation G is an isolated example and shows the effect of too little BACMP hardener.

Each test specimen was prepared from two panels of mild steel measuring 4 inches by 1 inch by about 0.02 inch (101.6 mm by 25.4 mm by about 0.5 mm) (as in ASTM D1002-64), each of which was abraded on one side using carborundum powder, washed and dried. The panels were degreased by suspension in trichloroethylene vapour for two hours, and were then air dried. The adhesive formulations were prepared by mixing the resin and hardener by hand in shallow aluminium pans to permit dissipation of heat. Each formulation was then applied to one surface of a panel and a joint was made by overlapping another panel half an inch (12.7 mm) over the adhesive. The overlapped portions were then clamped together under moderate pressure (about 210 g/cm$^2$) and each specimen was heated at 100° C. for 20 minutes in a thermostatically controlled fan-oven. The specimens were then allowed to cool and stand overnight before testing.

Each specimen was placed in an Instron Tensile Tester with 1 inch (25.4 mm) of each end gripped by the jaws such that the long axis of the specimen coincided with the direction of applied pull through the centre line of the jaw assembly. The loading was applied at a free crosshead speed of 2 mm/minute. In Table 2, the average load at failure in Kg./cm$^2$ of bond area, and the nature of this failure (cohesion or adhesion) is recorded for each specimen, which was tested at least in duplicate.

TABLE 1

| | Formulations (Parts/Weight) | | | | | | | | | |
|---|---|---|---|---|---|---|---|---|---|---|
| | A | B | C | D | E | F | G | H | I | J |
| Epoxy Resin (Ciba Geigy AY105) | 88 | 91 | 94 | 74 | 78 | 82 | 88 | 80 | 84 | 88 |
| TETA | 12 | 9 | 6 | — | — | — | — | — | — | — |
| BACMP | — | — | — | 26 | 22 | 18 | 12 | — | — | — |
| CHBMA | — | — | — | — | — | — | — | 20 | 16 | 12 |

TABLE 2

| Adhesive Formulation | Average Load at Bond Failure | Nature of Bond Failure |
|---|---|---|
| A (TETA) | 387 | Adhesion |
| B (TETA) | 385 | Adhesion |
| C (TETA) | 310 | Cohesion |
| D (BACMP) | 443 | Adhesion |
| E (BACMP) | 475 | Adhesion |
| F (BACMP) | 475 | Adhesion |
| G (BACMP) | 135 | Cohesion |
| H (CHBMA) | 410 | Adhesion |
| I (CHBMA) | 415 | Adhesion |
| J (CHBMA) | 400 | Adhesion |

The invention has been described in considerable detail with particular reference to certain preferred embodiments thereof but it will be understood that variations and modifications can be effected within the spirit and scope of the invention.

We claim:

1. A compound having the structure

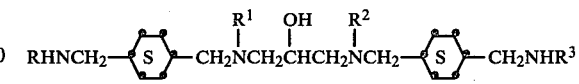

wherein R, R$^1$, R$^2$ and R$^3$ are each independently selected from hydrogen and straight or branched chain alkyl groups of 1 to 10 carbons, and such groups substituted with 1-3 of the same or different groups selected from alkoxy of 1-10 carbons, phenyl, cyclohexyl and hydroxyl.

2. A compound according to claim 1 wherein R is hydrogen or an alkyl group of 1 to 3 carbons.

3. A compound according to claim 2 wherein R is hydrogen.

4. A process for the preparation of a compound as claimed in claim 1, comprising contacting for a sufficient period of time to allow reaction, a compound or compounds of the formula:

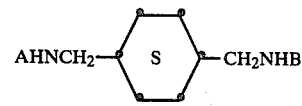

wherein A and B, which may be the same or different, are selected from R, $R^1$, $R^2$ and $R^3$, with epichlorhydrin in a molar ratio of from 2/1 to 5/1 at a temperature ranging from the freezing to the boiling point of the reaction mixture.

5. A process according to claim 4, wherein a base is added to the reaction mixture.

6. A process according to claim 5, wherein the base is sodium hydroxide.

7. A process according to claim 4, wherein the mixture is dispersed in a solvent.

* * * * *